United States Patent Office 2,710,001
Patented June 7, 1955

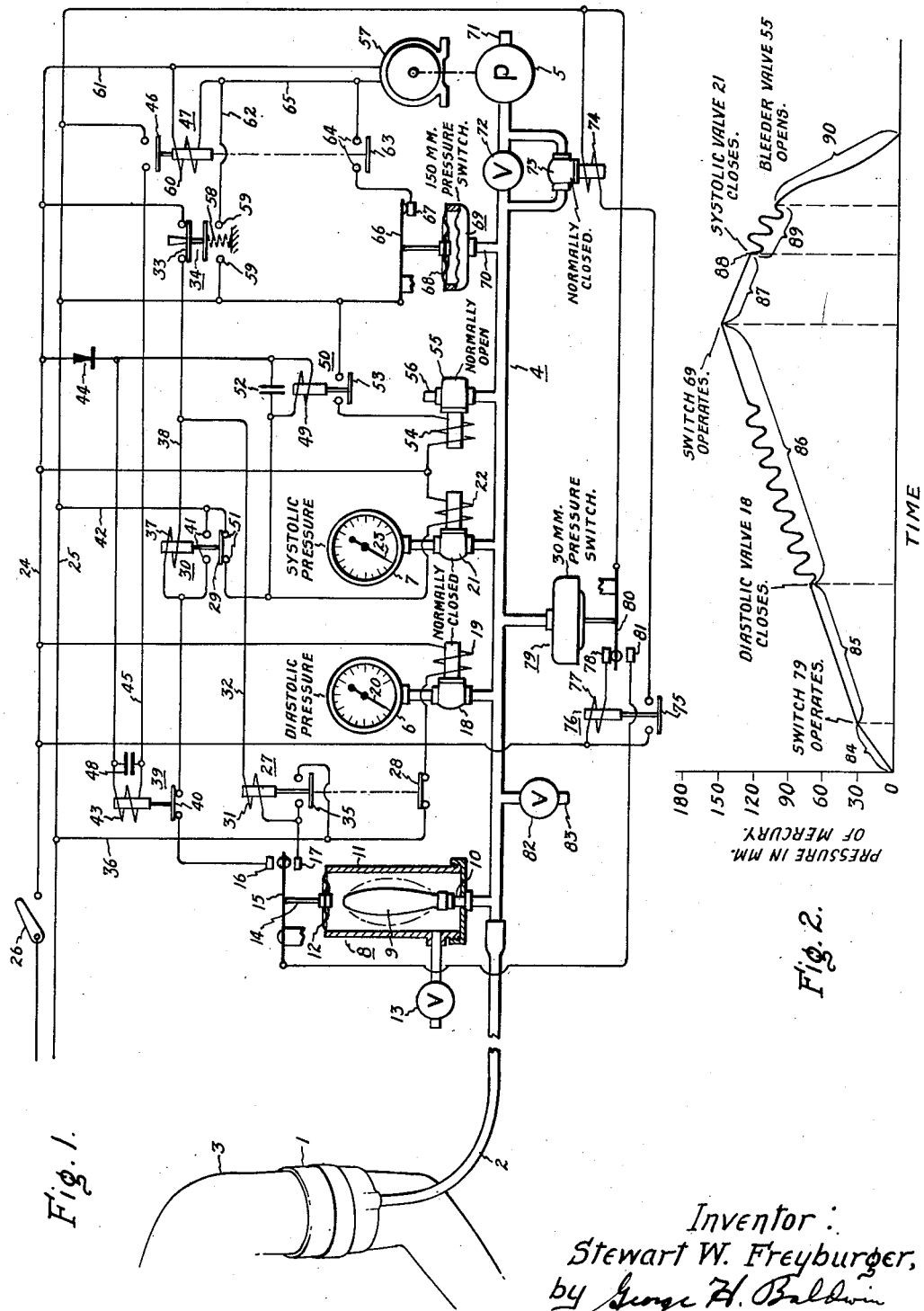

2,710,001

BLOOD PRESSURE INDICATOR

Stewart W. Freyburger, Gainesville, Fla.

Application November 8, 1952, Serial No. 319,590

5 Claims. (Cl. 128—2.05)

This invention pertains to blood pressure indicators, and more particularly, to automatically operating diastolic and systolic blood pressure indicating instruments of improved accuracy and greater simplicity.

An object of the invention is to improve the sensitivity and accuracy of, and to simplify, blood pressure indicators.

A more specific object is to provide an automatically operating diastolic and systolic blood pressure indicator wherein the errors and inconsistencies inherent in the interpretation by human operators of arterial sounds, for example, or in the reading of unstable pressure-indicating gauges at a particular moment, are minimized.

While direct measurement of blood pressure, wherein an external pressure indicator is connected directly into an artery through a hollow needle or the like, may be of greatest accuracy, the necessary surgical intervention precludes general use of direct measurement methods. Accordingly, outside of research laboratories, substantially all blood pressure measuring instruments operate to measure the pressure indirectly, as by the use of an artery compressing, inflatable cuff usually disposed at heart level on the upper arm of the subject. The most often used method of detecting the diastolic and systolic points as the cuff pressure changes includes the use of a stethoscope to listen for the sounds of Korotkow. It has been recognized that the pressure in the cuff, however, responds to arterial pulses during the time that cuff pressure is between the diastolic and systolic pressures. Thus, in a pressure system including a cuff, pressure pulsations will occur in the system whenever the system pressure is between the diastolic and systolic pressure values. It is this latter principle which is employed in this invention.

According to my invention, two pressure gauges are employed which are connected to a pressure system which includes an inflatable armlet or cuff, a pulse pressure responsive switch device and means for imposing a gradually increasing pressure in the system. A valve is provided for each of the two pressure gauges and the switch operates to close a valve to one of the gauges at the moment at which, during increasing pressure in the system, pressure pulsations start to occur. The gauge isolated by this valve registers, at the moment of isolation and continuously thereafter, the diastolic blood pressure of the subject, while the armlet and system pressure continues to increase until a predetermined maximum pressure is reached which is greater than the systolic pressure. Thereafter the device is arranged for a gradually decreasing system pressure. As the system pressure now reduces to the systolic blood pressure of the subject, pressure pulsations again begin, and the switch device operates to close the valve to the second of the two gauges, which gauge thereafter continuously indicates the systolic pressure. The instrument is further arranged to provide a rapidly increasing system pressure during the first part of the operating cycle, before diastolic pressure has been reached, and after the systolic pressure is indicated, a very rapid decrease of system pressure to end the operating cycle.

This invention accordingly has as additional objects the provision of a blood pressure indicating arrangement in which the diastolic pressure is taken as the cuff pressure is increasing and in which the systolic pressure is taken as the pressure is decreasing. For this reason, the pressure indications are of maximum accuracy for an indirect pressure indicating device, since erroneous indications have been found to occur if diastolic pressures are taken during a period of reducing cuff pressure and errors similarly occur if systolic pressure is taken during a period of increasing cuff pressure.

A further object accomplished by this invention is the provision of re-settable indicating means for indicating during as long a period as desired the diastolic and systolic blood pressure values for the subject. Such readings may be taken by an unskilled operator, and it is a particular advantage of my invention that the device can be made substantially completely automatic in operation whereby consistent and accurate readings are obtained regardless of idiosyncrasies of the operating personnel.

An additional object of this invention is to simplify and to minimize errors and malfunctioning in automatic blood pressure indicating instruments.

It is also an object of this invention to decrease the time of operation of automatic blood pressure indicating instruments through a complete cycle.

It is a still further object of this invention to provide an automatic blood pressure indicating instrument which requires merely the attachment of an armlet to the subject, the pushing of a starting button and the later removal of the armlet from the subject to provide a continuing visual indication of the systolic and diastolic blood pressure of the subject.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 1 is a diagrammatic view of a blood pressure indicating device in accord with this invention; and Fig. 2 is a graphical representation of the time sequence of a complete cycle of operation of the device of Fig. 1.

Referring now to Fig. 1, the device comprises an inflatable cuff or armlet 1 of known type which may be inflated, through a flexible tube, to restrict the flow of blood in the branchial artery of the upper arm of the subject 3 whose blood pressure is to be indicated. Tube 2 connects the cuff in a pressure system 4 which comprises a pressure pump 5, a diastolic pressure gauge 6, a systolic pressure gauge 7 and a pressure responsive switch device indicated generally at 8, together with certain valves and pressure responsive diaphragm switch devices hereinafter more particularly described.

The switching device 8 comprises a double membrane manometer including an inner diaphragm or bellows 9, which may be in the form of a rubber balloon, or the like, and which is in communication, internally, through a tube 10, with the remainder of pressure system 4. The inner diaphragm 9 is disposed within a substantially closed chamber or container 11 having a movable end wall in the form of a diaphragm 12 responsive to the pressure within the chamber. The interior of the chamber is vented through a restricted aperture to the atmosphere, preferably through a manually controlled valve 13. An extending arm 14 connects the diaphragm 12 for actuation of a movable contact member 15 of a single pole, double throw switch, and increasing pressure within container 11 causes contact member 15 to engage an upper stationary contact 16, while decreasing pressure within the container causes contact between member 15 and lower stationary contact 17. When the pressure within container 11 is equal to atmospheric pressure, diaphragm 12 centers member 15 between the stationary contacts. The resilience or flexibility of diaphragm 12, the distance between stationary contacts 16 and 17, and the size of the opening through vent valve 13 are so proportioned, relative to each other, that pressure pulsations in system 4 caused by the pulsing of a partially occluded branchial artery, when the cuff pressure falls between the diastolic and systolic pressure values of the subject, cause movable contact 15 to pulse or oscillate alternately from one to the other stationary contact.

Diastolic pressure gauge 6, which may be of the Bourdon tube or aneroid diaphragm type, connects through a solenoid valve 18 to the pressure system 4, the valve 18 being normally open in response to the normally energized condition of solenoid operating coil 19. Gauge 6, accordingly, registers or indicates in accord with the position of needle pointer 20 on a stationary calibrated scale, the pressure existing in system 4 so long as coil 19 remains energized, and upon de-energization of coil 19, valve 18 closes to isolate gauge 6 from system 4, thereby to lock pointer 20 to indicate the pressure existing in system 4 at the moment of de-energization of the coil 19.

A valve 21, similar to valve 18, connects systolic pressure gauge 7 to system 4 and valve 21 is normally held open by energization of solenoid coil 22 to permit needle pointer 23 of gauge 7 to register the pressure in system 4 until de-energization of coil 22 causes valve 21 to close and isolate gauge 7 from the system, thereby to lock pointer 23 in position to indicate the system pressure at the moment of de-energization of coil 22. Voltage is supplied to coils 19 and 22 from a bus 24, directly connected to one terminal of each of solenoid coils 19 and 22 and from the other terminal of each coil through relay contacts to a second bus 25. The buses 24 and 25 are connected to a suitable alternating current source of electric power, preferably 110–120 volt, through a manual switch 26. Diastolic relay 27 provides a contact member 28 in circuit between bus 25 and the last mentioned terminal of coil 19, and the corresponding terminal of coil 22 connects through contact member 29 of a systolic relay 30 to bus 25. Relays 27 and 30, and all other portions of the apparatus, are shown in Fig. 1 in the respective conditions existing when the instrument is not in use, with main switch 26 in open position. The operating coil 31 of relay 27 is normally connected through a conductor 32 and upper contact member 33 of momentary, manually operated, pre-setting or starting switch 34 to bus 24, and the other terminal of coil 31 connects to lower stationary contact 17 of switch device 8. A holding circuit is established for relay 27 upon energization of coil 31, since actuation into energized or picked-up condition causes contact member 35 to close against its stationary contacts to complete a circuit from bus 25 through conductor 36 to coil 31 and thence through conductor 32 and starting switch contact 33 to bus 24. As later explained, this holding circuit for relay 27 is established upon the occurrence of a momentary pressure pulsation in system 4 as the diastolic pressure is reached, such pulsation causing engagement between contacts 15 and 17 of switch device 8. Relay 30 controls systolic gauge valve 21 in much the same manner that relay 27 controls valve 18. One terminal of operating coil 37 of relay 30 is connected through conductor 38 and contact member 33 of momentary switch 34 to bus 24 and the other terminal of coil 37 is connected, during that portion of the operating cycle of the instrument in which relay 39 is de-energized, through contact member 40 of relay 39 to upper stationary contact 16 of switch device 8. Energization of coil 37, which occurs as the systolic pressure is reached during the reducing system pressure period of an operating cycle, establishes a holding circuit through contact member 29 which engages upper contacts 41 to complete the circuit from bus 24 through conductor 38 and coil 37, to conductor 42 and bus 25. Relay 39 is energized throughout the increasing pressure portion of the operating cycle to disable or break the energizing circuit for coil 37 of relay 30. The operating circuit for coil 43 of relay 39 comprises a rectifier 44 connected to supply direct current from bus 24 to the upper terminal of coil 43 and a conductor 45 which connects the lower terminal of the coil 43 through contact member 46 of pump motor control relay 47 to bus 25 during the period in which relay 47 is energized, corresponding to the increasing pressure portion of the cycle. Capacitor 48 is connected in parallel with coil 43 of relay 39 to cooperate with rectifier 44. The capacitor 48 is charged by the rectifier 44 until relay 47 opens contact 46, simultaneously with the start of the decreasing pressure portion of an operating cycle, and the capacitor then discharges through coil 43 to delay closing of contact 40 for a time sufficient to permit the pressure pump to decelerate and the system pressure to be reduced to a point at which contact 15 will have disengaged contact 16 and will be in engagement with contact 17.

Rectifier 44 also supplies direct current to actuating coil 49 of a fast bleeder valve controlling relay 50, one terminal of the coil 49 being connected through rectifier 44 to bus 24 and the other terminal being connected through lower stationary contacts 51 and movable contact 29 of relay 30 to bus 25. Capacitor 52 is connected across the terminals of coil 49 to provide time delay in the drop out operation of relay 50. Movable contact 53 of relay 50 controls the energization of coil 54 of solenoid-operated fast bleeder valve 55. Being normally closed throughout most of the operating cycle of the instrument, relay 50 establishes a circuit through coil 54 from bus 24 to bus 25, the valve 55 remaining closed when the coil 54 is energized. Relay 50 is thus arranged to open contact 53 shortly after picking up of relay 30 and after the consequent closing of systolic gauge isolating valve 21. The delayed dropping out of relay 50 causes solenoid valve 55 to open and rapidly to bleed system 4 through an open outlet tube 56.

Momentary starting switch 34 is arranged in a control circuit for motor 57, which drives pump 5. Depression of switch 34 against spring 58 causes momentary closing of contacts 59 to connect coil 60 of relay 47 across busses 24 and 25 through conductors 61 and 62, respectively. Actuation of relay 47 closes its contact member 63 across contacts 64 and establishes a holding circuit from bus 24 through conductor 61 and coil 60, conductor 65, contacts 64 and contact member 63 through a movable switch member 66 to bus 25. Contact member 63 of relay 47 further serves to energize motor 57, since it will be apparent that motor 57 is connected in parallel with coil 60. Switch member 66 remains in contact with its fixed contact 67 until raised therefrom by motion of diaphragm 68 of an aneroid switch device 69, the aneroid device being connected for pressure response through a tube 70 to system 4 and being arranged to raise member 66 from contact 67 at a predetermined maximum system pressure. The device 69 is so designed or adjusted that the switch 66 opens at a system pressure of, for example, 150 mm. of mercury or between 150 mm. and 300 mm., as desired in accord with the maximum systolic pressure which may be expected to occur in any one of the subjects of whom the blood pressure is to be measured.

Pump 5 is arranged to supply air under pressure to the system 4 from an input tube 71 open to the atmosphere through a manually adjustable rate controlling valve 72. Valve 72 is preferably set or adjusted to provide sufficient compressed air flow into system 4 to raise the system pressure, while pump 5 is operating, at a rate of between about 2 and 3 mm. of mercury per second. A solenoid operated bypass valve 73 is, however, arranged in parallel with valve 72, and when solenoid valve 73 is opened, the rate of pressure increase in system 4 may be substantially greater. Valve 73 opens upon energization of coil 74, and coil 74 is connected directly to bus 25 at one terminal and to bus 24 through a contact member 75 of relay 76 when relay 76 is closed. Coil 77 of relay 76 is energized to close contact 75 during the first portion of an operating cycle by a connection from bus 24 through the coil 77 to a stationary contact 78 of aneroid operating switch device 79, thence through the movable contact member 80 of the aneroid device to bus 25. Aneroid device 79 is arranged to retain member 80 in engagement with stationary contact 78 until the pressure in system 4 increases to a predetermined minimum pressure, such as about 30 to 50 mm. of mercury, such minimum pressure being below the lowest diastolic pressure to be expected. As the system pressure reaches the value of response by aneroid device 79, contact member 80 moves out of engagement with stationary contact 78, de-energizing relay 76 and closing valve 73, and into engagement with stationary contact 81, this latter engagement establishing a circuit from bus 25 to movable contact member 15 of switch device 8.

The system shown in Fig. 1 is arranged to provide an increasing pressure in system 4 until a predetermined maximum pressure is reached, and at that time, to de-energize motor 57 and stop pump 5. Thereafter the system 4 should bleed at a rate sufficient to reduce the system pressure at between about 2 and 3 mm. of mercury per second. To establish this reduction rate may require an auxiliary manually adjusted slow bleeder valve 82, which will be seen to be connected between system 4 and an open tube 83. If pump 5 is of a type permitting back leakage, bleeder valve 82 may not be necessary, or it may be necessary, if leakage is found to occur from system 4 back through pump 5, completely to close a bleeder valve 82 if one is provided. Thus valve 72 might control not only the rate of increase in system pressure, but also the rate of decrease by permitting escape of air from system 4 out through pump 5 and open tube 71, in case it is desired to eliminate valve 82 and if the air so leaking back through valve 72 can slowly escape to tube 71 through pump 5.

The sequence of an operating cycle of the device of Fig. 1 may best be understood by a consideration of the diagram of Fig. 1 and the graphical pressure curve for system 4 which is shown in Fig. 2. The first steps in an operating cycle are the closing of switch 26 to provide electric energy to the system and the wrapping of armlet 1 about the upper arm of the subject. It is immaterial whether the switch 26 closed before or after application of the armlet.

Briefly, operation of the instrument through a cycle may be described as follows, a more detailed explanation of operation being set forth hereinafter.

Operation of momentary pre-setting switch 34 at the start of an operative cycle breaks the circuit from power bus 24 to the exciting coil of each of relays 27 and 30 causing these relays to drop out into their respective un-excited conditions of rest. When in the condition of rest corresponding to non-excitation each of relays 27 and 30, through contacts 28 and 29, respectively, controls the respective one of solenoid valves 18 and 21 into open position. Thus device 24 comprises manual pre-setting means to pre-set each of relays 27 and 30 into the condition of rest to maintain in open position the respective interconnected one of valves 18 and 21.

The pulse sensitive device 8 is so arranged that when contact member 15 moves between contacts 16 and 17, the relays 27 and 30 are operated into the other rest condition, such other rest condition being, in accord with the circuit shown, the excited condition of the relay. However, device 8 is disabled in respect to relay 30 during the rising pressure period of the cycle, the means for so disabling the device comprising the pressure switch 69 and relay 47 which cooperate to energize disabling relay 39 and to maintain contact 40 open, breaking the connection from contact 16 of device 8 to the coil 37 of device 30. Upon reaching maximum system pressure, relay 47 opens contact 46 and, after a short delay produced by capacitor 48 during which device 8 adjusts to the falling pressure by closing contact 15 against contact 17, disabling relay 39 drops to close contact 40 and enable device 8 to operate systolic relay 30 when contact 15 again meets contact 16.

The operation in more complete detail is described in the following paragraphs.

The closing of switch 26 immediately causes relay 76 to pick up and to energize coil 74 of solenoid valve 73, thereby opening valve 73 as a bypass around valve 72.

After armlet 1 is applied and switch 26 closed, to start a cycle, switch 34 is momentarily depressed causing a break in the circuit from bus 24 to relays 27 and 30, thereby to pre-set these relays into de-energized or dropped out condition, and to cause motor control relay 47 to pick up. The closing of contacts 64 of relay 47 further results in the establishment of a holding circuit for the relay and the provision of power to motor 57, which commences to drive pressure pump 5. The closure of contact member 46 of relay 47 against its stationary contacts also energizes coil 43 of relay 39, opening the relay contact 40 and insuring non-operation of systolic relay 30 during the increasing pressure period of the operating cycle.

Upon release of switch 34, bus 24 is connected to one terminal of each of coils 31 and 37 of relays 27 and 30, respectively, but the other terminal of each of these coils remains disconnected, for the time being, from bus 24 and the relays 27 and 30 are not energized.

Since movable contact member 15 of switch device 8 is disconnected from bus 25 during the initial period of operation of pump 5, the system pressure increases rapidly through bypass valve 73, along portion 84 of the pressure curve of Fig. 2, without danger of any false operation of relays 27 or 30 during this initial period. As the system pressure increases, diaphragm or bellows 9 expands in container 11, and because of the restricted nature of outlet 13, the pressure in container 11 increases above atmospheric pressure and contact member 15 is forced upwardly into engagement with stationary contact 16. When the system pressure increases to about 30 mm., aneroid switch device 79 operates to de-energize coil 77 and thus to de-energize coil 74 and close bypass valve 73, thereby reducing the rate at which system pressure increases as indicated by the reduced slope of portion 85 of the curve in Fig. 2. As of the time of operation of minimum pressure responsive switch 79, at about 30 mm. of pressure, and, during the period of pressure increase, at a rate of about 2 or 3 mm. per second, along portion 85 of the curve, movable contact 15 of switch device 8 is connected through contact member 80 of device 79 to bus 25. So long as member 15 remains in contact with upper stationary contact 16 due to continuing expansion of bellows 9, however, no change in the relay or valve conditions occurs. When the system pressure has increased to the diastolic blood pressure of the subject, which, in accord with the exemplary curve of Fig. 2, might be at 70 mm., the system pressure begins to undergo a series of pulsations at the pulse rate of the subject, and these pulsations cause corresponding momentary reductions of the volume in bellows 9. The pressure within chamber 11, accordingly, changes above and below atmospheric pressure at the pulse rate for the subject. Diaphragm 12 of chamber 11 responds to the fluctuating pressure in chamber 11 and causes oscillations of movable member 15, the oscillations being such as to cause member 15 to move periodically, at the pulse rate, from contact 16 into engagement with contact 17, and from 17 to 16. When member 15 contacts stationary contact 17 a circuit is established from bus 25 through member 15 to coil 31 and from coil 31 through conductor 32 and contact member 33 to bus 24. Relay 27, accordingly, is energized and picks up, breaking the circuit established through contact member 28 and establishing a holding circuit which retains relay 27 in energized condition. The circuit broken at contact member 28 includes the solenoid coil 19 of diastolic valve 18, and the de-energization of this coil causes valve 18 to close. It is to be noted that the contact between contacts 15 and 17 must be of sufficient duration for the relay 27 to operate and establish its holding circuit by closing its contact member 35. Pulsations of small magnitude, which may occur at pressures below the true diastolic pressure, are discriminated against and do not cause the relay 27 to hold in.

After the operation of relay 27 to close its holding circuit and to close valve 18, the coil 31 of relay 27 is completely disassociated with all operating parts of the instrument except starting switch 34. Accordingly, valve 18 remains closed until the starting switch is again operated, such as when it is desired to use the instrument with the next subject. The gauge 6 being thus isolated from system 4, it indicates and continues indefinitely to indicate the diastolic pressure for the subject, until the instrument is re-set for the next cycle of pressure measurement.

The system pressure continues its gradual increase uninterruptedly, being not effected by operation of valve 18, as indicated by portion 86 of the curve of Fig. 2. Until the systolic pressure of the subject is reached, pulsations are superimposed upon the system pressure by the partially occluded artery. No other operational function is performed, however, until the system pressure has increased to a predetermined maximum value corresponding to the actuating pressure selected for aneroid switch device 69. This maximum pressure may be, for example, 150 mm., and should be greater than the systolic pressure. As the system pressure reaches the predetermined maximum, aneroid device 69 responds by opening contacts 66, 67, breaking the holding circuit for relay 47 and de-energizing motor 57. Relay 47 drops out to provide an additional break in the holding and motor energizing circuit at contact member 63. Reclosing of contacts 66, 67 thereafter will be ineffective.

The release of relay 47 further opens contact member 46 to initiate delayed de-energization of coil 43 of relay 39. During the interim of perhaps a second or two while capacitor 48 is discharging through coil 43, the pump 5 decelerates and the system pressure begins to fall. Movable contact 15 of device 8, accordingly, engages stationary contact 17.

After the delay interval, relay 39 becomes de-energized and contact member 40 establishes an actuating circuit from stationary contact 16 to coil 37 of systolic relay 30. Since movable contact 15 remains engaged with contact 17 during the first portion of the reducing pressure cycle, no operation of relay 30 occurs, throughout the period of gradually reducing pressure indicated at 87 on the curve. The pressure decrease at about 2 to 3 mm. per second, through adjusted slow bleeder valve 82, until the systolic pressure of the subject is again reached. Pulsations of the system pressure which begin to occur at the systolic pressure, at point 88 on the curve, are effective to oscillate movable member 15 between contacts 16 and 17, and upon the first firm contact between member 15 and upper stationary contact 16, relay 30 is excited and picks up to close contacts 41 and to establish a holding circuit for itself which retains the relay continuously energized thereafter, until a new cycle is to be started.

The operation of relay 30 opens contacts 51 in circuit with coil 22 of systolic valve 21. Valve 21, being thus de-energized, closes to isolate gauge 7 from the system, gauge 7 then and thereafter indicating the system pressure at the systolic pressure point 88, until a new cycle is initiated.

The opening of contacts 51 further initiates de-energization of relay 50. The breaking of the circuit of coil 49 permits capacitor 52 to discharge for a second or two through coil 49, and as the capacitor becomes discharged, relay 50 drops out, opening the circuit at contact member 53 to coil 54 of fast bleeder valve 55. The time delay provided by capacitor 52 prevents false opening of valve 55 by any very brief opening of contacts 51, and more importantly, does not permit any very rapid system pressure drop before systolic gauge isolating valve 21 has become firmly seated completely to isolate gauge 7. When the relay 50 drops out, after the period of a second or two represented by portion 89 of the curve of Fig. 2, coil 54 becomes de-energized and the fast bleeder valve 55 opens rapidly to vent the system 4 through tube 56 to the atmosphere, as represented by portion 90 of the curve. The armlet 1 may now be detached from the arm of subject 3. The gauges 6 and 7 being locked to retain the pressure indications existing at the respective moments of closing of valves 18 and 21, respectively, readings of the diastolic and systolic blood pressures may be made at any time prior to operation of starting switch 34 for the next cycle. Even opening of main switch 26 does not unlock gauges 6 and 7, although opening and closing of switch 26 will result in such re-setting of the instrument.

While only certain preferred embodiments of this invention have been shown and described by way of illustration, many modifications will occur to those skilled in the art, and it is therefore to be understood that it is intended, in the appended claims, to cover all such modifications as fall within the true spirit and scope of this invention.

What is claimed as new and desired to secure by Letters Patent of the United States is:

1. In a blood pressure measuring instrument, the combination of: a pressure system including a cuff, means operatively connected to said system and operative gradually to increase the pressure in said system to a value greater than the systolic pressure to be measured and thereafter gradually to decrease said system pressure, a pair of relays, each said relay comprising respective contact means, each said relay having two conditions of rest including an energized condition and a de-energized condition, a respective holding circuit for each said relay completed by the respective said contact means for each relay in the energized condition thereof, a pair of valves, each said valve having respective electrical actuating means and each being operable by its said respective actuating means between open and closed position, each of said respective actuating means being controlled by said contact means of a respective said relay whereby each said valve is maintained open in response to one of said energization conditions of the respective said relay and maintained closed by the other said energization condition of the respective said relay, manual pre-setting means operatively connected to said relays and operative to pre-set each of said relays into said one energization condition, a pulse sensitive switching device connected to said pressure system and having electrical switch means connected to operate each said relay from said one energization condition into said other energization condition upon the occurrence of pressure pulses in said system, pressure responsive means operatively connected to said system for response to the pressure in said system and operatively connected to said device and operative to disable said device with respect to one of said relays throughout a period of rising system pressure and to enable said switch device as to said one relay as said system pressure starts to decrease, a systolic pressure gauge connected to said system through the one of said valves controlled by said contact means of said one relay, and a diastolic pressure gauge connected to said system through the other of said valves.

2. In a blood pressure instrument, the combination of: a pressure system including a cuff, means operatively connected to said system and operative gradually to increase the pressure in said system to a value greater than the systolic pressure to be measured and thereafter gradually to decrease said system pressure, a pair of relays, selective actuating means for said relays comprising a pressure-pulsation responsive switch device, a diastolic pressure gauge, a systolic pressure gauge, an electrically operated diastolic gauge valve connecting said diastolic gauge to said system, an electrically operated systolic gauge valve connecting said systolic valve to said system, contact means controlled by one said relay connected to operate said diastolic valve into closed condition upon actuation of said one relay by said device, means operatively connected to said relays and operative to pre-set said relays into condition for actuation by said device, whereby said one relay is in respectively different energization conditions before and after said actuation thereof, said one relay being de-energized in one of said conditions and being energized in said other condition, a holding circuit for said one relay completed through said contact means of said one relay in response to said energized condition of said one relay, contact means controlled by the other said relay connected to operate said systolic valve into closed condition upon actuation of said other relay by said device, said other relay being in respectively different energization conditions before and after said actuation thereof, said other relay being de-energized in one of said conditions thereof and being energized in said other condition thereof, a holding circuit for said second relay completed through said contact means of said other relay in response to said energized condition of said other relay, maximum pressure responsive means connected to respond to said system pressure, electrical switching means responsive to operation of said pre-setting means to disconnect said other relay from said device and responsive to said maximum pressure responsive means to re-connect said other relay for actuation to said device.

3. In a blood pressure measuring instrument, a pressure system including an inflatable armlet, means operatively connected to said system and operative gradually to increase the pressure in said system to a value greater than the systolic pressure to be measured and thereafter gradually to decrease said pressure, a diastolic pressure gauge, a diastolic solenoid valve responsive to solenoid energization to connect said gauge to said system and responsive to solenoid de-energization to isolate said gauge from said system, a systolic gauge, a systolic solenoid valve responsive to solenoid energization to connect said systolic gauge to said system and responsive to solenoid de-energization to isolate said systolic gauge from said system, a diastolic relay having normally closed contacts energizing said diastolic valve solenoid and also having normally open contacts, a pressure responsive switching device connected to respond to said system pressure comprising a pair of stationary contacts and a contact movable between and alternately engageable with said stationary contacts, said device being operative to retain said movable contact in engagement with one of said stationary contacts in response to an increasing pressure in said system and to move said movable contact into engagement with said other stationary contact in response to decreasing pressure in said system, said diastolic relay having a coil connected to said other contact for energization of said relay upon said motion of said movable contact into engagement with said other contact, a holding circuit for said diastolic relay completed through said normally open contacts to retain said diastolic relay in energized condition following said energization of said coil of said diastolic relay, a disabling relay having normally open contacts connected between the actuating coil of said systolic relay and said one stationary contact of said switching device, said means first above mentioned comprising maximum pressure responsive means responsive to said system pressure to terminate said gradual pressure rise and initiate said gradual decrease in pressure, said maximum pressure responsive means being connected to said disabling relay to operate said disabling relay after said initiation of decreasing pressure into position to complete said connection of said systolic relay actuating coil to said one stationary contact, a solenoid operated fast bleeder valve connected to said system, a normally energized time delay relay normally completing a bleeder valve closing circuit for said bleeder valve, said systolic relay having normally closed contacts and normally open, holding-circuit contacts, said normally closed contacts normally energizing said systolic solenoid valve and said time delay relay, said systolic relay being energized through said connection completed by said operated disabling relay in response to engagement of said movable contact with said one stationary contact to close said systolic valve, to hold itself in and to initiate delayed opening of said bleeder valve.

4. In an automatic blood pressure indicating device for indicating the blood pressure of a subject, a pressure system including an armlet, a pump to increase the pressure in said system, a manually adjusted valve between said pump and system to control the rate of increase of pressure in said system, an electrically operated bypass valve connecting said pump and system, a pressure responsive switch controlling said bypass valve to open said valve in response to system pressures below a predetermined minimum diastolic pressure to be indicated and to close said valve in response to system pressure greater than said minimum, a diastolic pressure gauge, a solenoid valve connecting said gauge to said system, a diastolic relay, pulsating-pressure-responsive switch means connected to said diastolic relay to actuate said relay in response to pulsations of pressure in said system at the diastolic pressure of said subject, said first pressure responsive switch comprising contacts which are open below said minimum pressure and closed at greater pressure, said contacts being in circuit with said switch means to disable said switch means below said minimum pressure and enable said switch means above said minimum pressure to actuate said relay, said solenoid valve being electrically connected to said relay and responsive to said actuation of said relay to close, thereby to isolate said diastolic pressure gauge, maximum pressure responsive means operable to disable said pump in response to the occurrence in said system of a predetermined maximum pressure greater than the maximum systolic pressure to be measured, said system comprising slow bleeder means, a systolic relay, relay means operable in response to said operation of said maximum pressure responsive means to connect said systolic relay to said pulsating-pressure-responsive switch means for actuation thereby, time delay means connected to said relay means to delay said operation thereof in response to said operation of said maximum pressure responsive means, a systolic pressure gauge, a systolic solenoid valve connecting said systolic gauge to said system, said systolic solenoid valve being electrically connected to said systolic relay for closing to isolate said systolic gauge upon actuation of said systolic relay by said pulsating-pressure-responsive switch means, a fast bleeder valve connected to said system, a time delay bleeder valve relay electrically connected for delayed actuation to said systolic relay to open said fast bleeder valve after a predetermined time delay period following said actuation of said systolic relay.

5. A blood pressure measuring instrument comprising a pressure system including a cuff and having means connected to said system gradually to increase the pressure in said system to a value greater than the systolic pressure to be measured and thereafter gradually to decrease said system pressure, the combination of: a pair of relays comprising respective contact means, each said relay having two conditions of rest including an energized condition and a de-energized condition, a respective holding circuit for each said relay completed by the respective said contact means for each relay in the energized condition thereof, a pair of valves, each said valve having respective electrical actuating means and each being operable by its said actuating means between open and closed position, each of said respective actuating means being connected to and controlled by said contact means of a respective said relay whereby each said valve is maintained open in response to one said energization condition of its respective said relay and maintained closed by the other said energization condition of its respective said relay, manual pre-setting means connected to the energizing circuit of said relays to pre-set each of said relays into said one energization condition, a pulse sensitive switching device connected to said pressure system and having electrical switch means connected to operate each said relay from said one energization condition into said other energization condition upon the occurrence of pressure pulses in said system, pressure responsive means connected to respond to said system pressure to disable said device in respect to one of said relays throughout a period of rising system pressure and to enable said switch device as to said one relay as said system pressure starts to decrease, a systolic pressure gauge connected to said system through the one of said valves controlled by said contact means of said one relay, and a diastolic pressure gauge connected to said system through the other of said valves.

No references cited.